March 20, 1956 G. W. EMELE ET AL 2,738,861
ENGINE CYLINDER LUBRICATING MEANS
Filed July 9, 1952
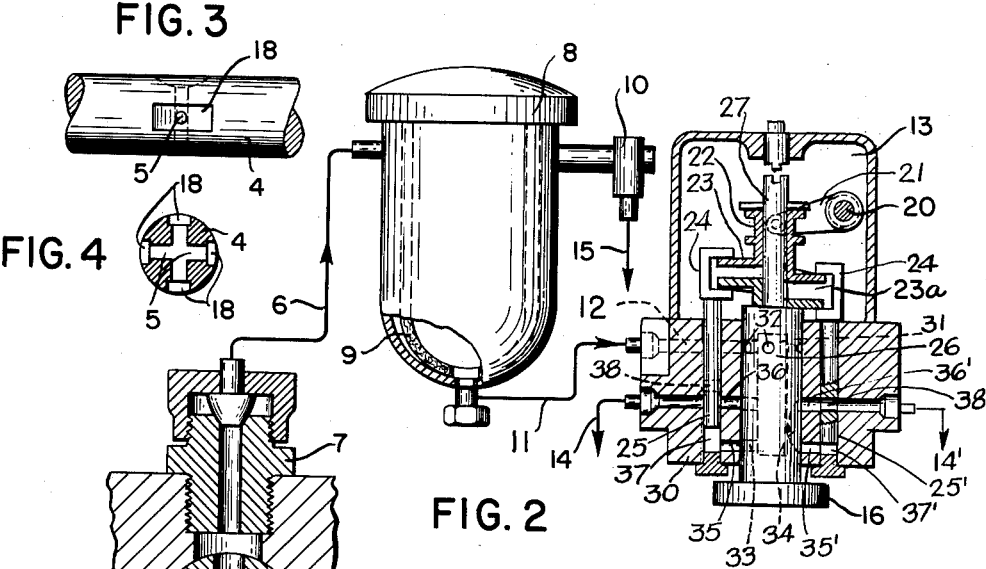
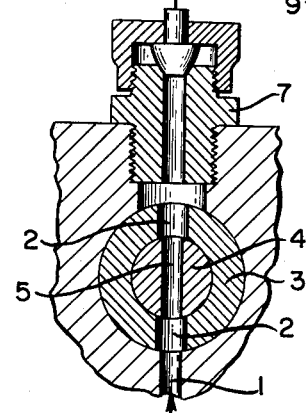
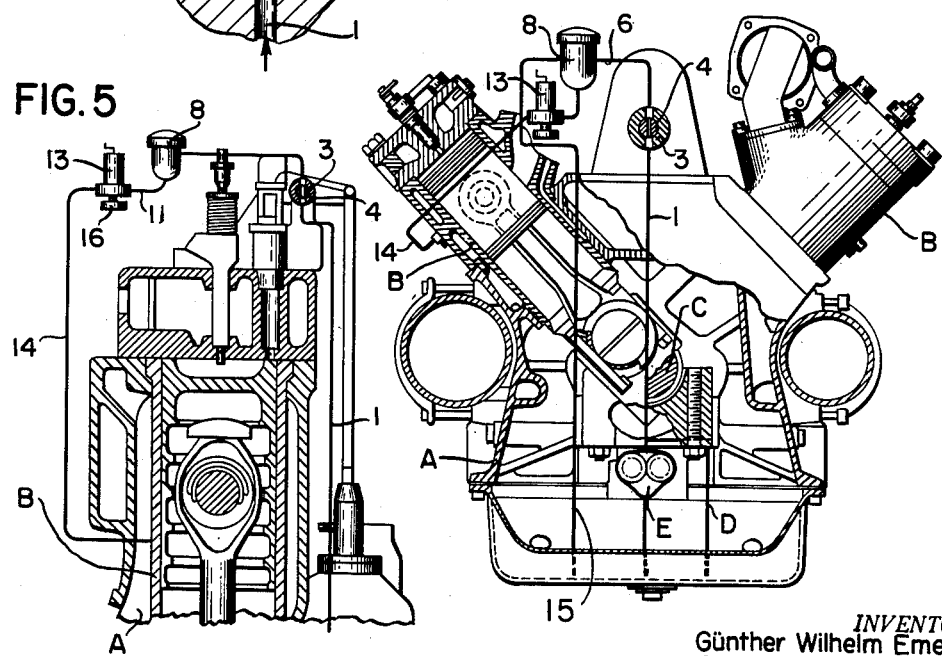
INVENTOR.
Günther Wilhelm Emele
Otto Hirsch
BY
Knight Bros.
ATTORNEY

United States Patent Office 2,738,861
Patented Mar. 20, 1956

2,738,861

ENGINE CYLINDER LUBRICATING MEANS

Günther Wilhelm Emele, Munich-Obermenzing, and Otto Hirsch, Beiberach (Riss), Germany, assignors to Krauss-Maffei Aktiengesellschaft, Munich-Allach, Germany, a corporation of Germany Application July 9, 1952, Serial No. 297,958

7 Claims. (Cl. 184—6)

The invention relates to devices for lubricating the piston-run surfaces of the cylinders of reciprocating engines, particularly internal-combustion engines, with the aid of an additional oil pump of adjustable delivery.

It is a known expedient to use such a pump for additionally lubricating the cylinder slide surfaces with accurately metered quantities of fresh oil. Today, however, such a fresh-oil lubrication is used only rarely with internal-combustion engines because the known fresh-oil lubricating devices are too cumbersome and are dependent upon careful attendance since lack of fresh oil due to inattentive maintenance may endanger the engine.

On the other hand, an additional and accurately adjustable lubrication of the piston-run surfaces is highly desirable especially in large internal-combustion engines operating with high combustion pressures. Certain known lubricating pumps of small size, composed of a number of pump elements and delivering through separate pressure lines a metered and accurately adjustable oil quantity to the respective spots to be lubricated, are suitable only for the application of fresh oil. For instance, these pumps cannot be inserted into the circuit of a pressure lubrication system because their working and control pistons fit closely against their respective bores so that impurities of the circulating pressure oil collecting in the narrow interstices would soon impede the pump movements, desires, these fresh-oil lubricating pumps deliver the required and adjusted oil quantity only when the suction side, common to all pump elements, is not subjected to over pressure or to more than a slight pressure gradient. Otherwise always the maximum quantity is delivered to the spots to be lubricated. Consequently, the provision of a fresh-oil lubricating pump within the circuit of a circulatory pressure lubrication system would be feasible only if at the suction side of this pump the circulating pressure oil had no pressure or only a slight pressure, a well as a certain minimum degree of purity.

While it has also become known to provide the lubricant circulation system of machines with pressure regulating devices followed by an oil strainer, these known regulating devices are attached to the lubricant circulation system as an additional accessory and serve only to maintain the oil pressure behind the strainer as constant as possible. To secure this effect with a cold lubricant and at a reduced permeability of the strainer, the pressure regulating device causes an increase in pressure ahead of the strainer until the lubricant has reached its normal operating temperature. Thereafter, any excessive supply of lubricant is passed back into the lubricant trough or sump through the regulating device which, for this purpose, has a spring-loaded differential piston and an overflow conduit controlled by the differential piston. This known regulating device, however, is not suitable for reducing the high pressure of a pressure-lubricant circulation system to the slight pressure magnitude needed for feeding a fresh-oil pump of the above-mentioned type, aside from the fact that the device represents an additional accessory structure considerably increasing the cost of the complete system.

It is therefore an object of the invention to devise a simple and reliable device that can readily be joined with a high-pressure lubricant circulation system to apply to the piston-run surfaces of the cylinders or the like spots to be additionally lubricated an accurately metered and constrainedly delivered quantity of lubricant from the circulatory system by means of a metering fresh-oil pump of the type requiring, for accurate metering, the maintenance of an only slight pressure at its suction side.

To this end, and in accordance with the invention, the piston-run surfaces of the engine cylinders are lubricated with lubricant branched-off from the high-pressure lubricant circulation system of the engine which is supplied in cleaned condition to the suction side of an interposed fresh-oil lubricating pump of the above-mentioned type at a slight and still permissible pressure and in a pre-metered quantity as required for the desired cylinder lubrication. In such a device, the branched-off lubricant line leading from a pressure point of the high-pressure circulatory system to the fresh-oil pump extends first through a springless pressure-reduction device and thence through an oil filter or strainer with a pertaining pressure-relief valve.

These and other features of the invention will be apparent from the following description in conjunction with the embodiment of the invention exemplified by the drawing in which:

Fig. 1 shows a partially sectional front view of an engine with a superimposed schematic illustration of a lubricating device according to the invention;

Fig. 2 is a non-detailed illustration of the lubrication device showing the pertaining pressure-reduction means and pump in cross section;

Fig. 3 is a partial side view and Fig. 4 is a cross section of a shaft member pertaining to the device accorring to Figs. 1 and 2; and Fig. 5 shows schematically a modified embodiment of a lubricating device according to the invention superimposed upon a partial and sectional view of an engine cylinder structure.

In Figs. 1 and 5, the crankcase and oil sump structure of an internal-combustion piston engine is represented at A. Joined with the structure are the cylinders B whose respective reciprocating pistons act upon the crankshaft C of the engine. The engine is equipped with a high-pressure lubrication system which includes a main lubrication pump E and a circulation system. The lubricant circulation system, serving to pressure lubricate the main crankshaft bearings and other component engine parts, is represented by an only fragmentary showing of a conduit circuit D which extends from the pressure side of pump E to the points to be lubricated and thence back to the oil sump.

To provide additional low-pressure lubrication of the piston-run surfaces in the cylinders by metered amounts of clean oil, the system is equipped with a device according to the invention whose input duct 1 branches off from the circulatory high pressure system at the pressure side of the main lubricating pump E. This inlet duct 1, as is apparent from Fig. 2, leads to a pressure reduction device consisting essentially of a bearing bushing or sleeve 3 with two coaxial and diametrically opposite bores 2 and of a driven auxiliary shaft 4 passing through the bushing 3. The auxiliary shaft 4 is preferably a component shaft of the engine, for instance the drive shaft of the fuel injection pump of a diesel engine; and the bushing 3 may consist of one of the bearings normally used as a journal for that engine shaft. The bushing 3 is disposed in a bearing, projection or other part of the crankcase or housing structure. The shaft 4 has one or several bores 5 which extend diametrically through the shaft 4 or are directed at an angle to each other (see Figs. 3, 4). The shaft bores 5 and the openings 2 lie in a common cross sectional plane so that they are in registry with one another in a given angular position of the shaft. One of the bores 2 communicates with the oil inlet duct 1 while the other bore is connected with an oil line 6, for instance by means of a customary screw nipple or cap nut connection 7. When the auxiliary shaft 4 is turning in any direction, the shaft bores interconnect the openings 2 of bushing 3 so that the high-pressure inlet duct 1 communicates with line 6 during intermittent and short-lasting periods of time. As a result the oil line 6 is supplied with oil of a reduced pressure depending upon the number and cross section of the bores 5 in the auxiliary shaft 4. At the same time, the device acts to some degree also in a metering sense.

The oil line 6 is connected to an oil filter 8 of the known type whose housing is partitioned into two chambers by a filtering insert 9. The chamber surrounding the insert 9 communicates with a relief valve 10 whose outlet conduit 15 leads back to the oil trough or sump. The valve 10 passes the major portion of the supplied quantity of oil back to the sump. The inner filter chamber enclosed by the insert 9 is connected with an oil line 11 which carries only the small quantity of oil required for the lubrication of the piston-run surfaces of the engine cylinders. Line 11 leads to the suction inlet structure 12 common to the pump elements of a lubricating pump 13 designed only for operation with fresh or clean oil. The outlet side of pump 13 is connected by respective lines 14 with the individual cylinders.

The fresh-oil pump 13 is of the positive displacement type having gear or plunger elements which issue accurately dosed amounts of oil at low pressure. As mentioned, pumps of this kind are known as such. Their movable elements have the close fit required for maintaining a constant volumetric output, provided the oil pressure at the pump inlet side has a sufficiently low pressure. The pump is driven by a gear 16 preferably from the crankshaft of the engine or from another shaft, such as the cam shaft or auxiliary shaft, deriving its motion from the engine crankshaft. It will be understood that the pump E of the main lubrication system schematically indicated in Fig. 1, as well as the auxiliary shaft 4 of the pressure reduction device are likewise driven from the crankshaft.

Fig. 2 illustrates the structural details of a well-known type of fresh-oil pump utilized in the cylinder-lubricating device constituting the invention. It will be understood that the structure of this fresh-oil pump in itself is not part of the present invention, but merely a combined part thereof. The pump 13 of Fig. 2 is equipped with the usual device for adjusting the delivered output quantity. This device comprises a shaft 20 which stands transversely across the pump housing and carries an arm 21 whose bifurcated end straddles a grooved sleeve 22 and has pins slidably engaging the groove of the sleeve. Sleeve 22 is joined with the piston-driving cam member 23. Axial displacement of sleeve 22 together with its cam member 23 with respect to cam member 23a by means of shaft 20 and arm 21 causes a corresponding change in the effective stroke of the pump plungers, as is hereinbelow more fully described.

As shown in Fig. 2, the revolving pump member driven from the gear 16 comprises an upper shaft portion 27 and a lower shaft portion 26. The lower portion 26 has a central hollow 31 with lateral openings 32 distributed over the periphery and has a groove 34 at one point of the periphery, this groove not being in communication with the hollow 31. The block 30 in which the member 26 is revolvably mounted has a number of axially directed bores, such as those denoted by 25 and 25', for receiving the respective pump pistons. The block 30 has a group of bores 35, 35' and a second group of bores 36, 36'. The bore 33, during the revolution of member 26, communicates intermittently with the bores 35, 35' and thus communicates alternately with the spaces 37, 37' beneath the respective pistons 25, 25'. At least one of the bores 32 is always in communication with the suction inlet duct 12. The oil flows under slight pressure from duct 12 through one of the bores 32 into the hollow 31 and passes, in the position shown, through the bores 33 and 35 into the cylinder space 37 beneath the piston 25. Each piston has a passage 38 or 38', which connects the bores 36, 36' with the oil outlet ducts 14, 14' only during the lower portion of the piston stroke, for instance when the piston 25' reaches the illustrated position.

Assume that piston 25 is raised and that piston 25' is moving downward and has reached a point close to its lower end of travel. Then, during the nearly completely upward stroke of piston 25, an amount of oil is drawn into the chamber 37 through the bores 33 and 35 from the interior 31 of member 26. Shortly thereafter the chamber 37 is closed due to the fact that the bore 33 of member 26 passes out of register with the bore 35. The piston 25 then remains in the raised position until the member 26 reaches a point of revolution at which the cam device 23, 23a pushes the piston downward. During its downward movement, the piston 25 will reach a position corresponding to the position illustrated for piston 25', wherein the groove 34 of member 26 interconnects the ducts 35' and 36'. When the piston 25' pushes downwardly further and reduces the volume of the chamber underneath, the quantity of oil previously enclosed in this chamber is forced through duct 35', groove 34, duct 36', and passage 38' to the oil outlet 14'. Similar action of piston 25 will thus alternately cause a measured quantity of oil to be discharged through the oil outlet 14.

The piston operation described in the foregoing is controlled by a cam device. As described above, this device comprises a cam disc 23a firmly joined with the shaft 27 of the revolving pump member. Another cam member 23, revolving together with the member 23a, is axially displaceable by means of the sleeve 22, the arm 21, and the shaft 20.

When the axial position of cam member 23 is adjusted so that it touches cam member 23a, their total pitch or axial cam length is about equal to the vertical spacing between the two arms of the bracket 24 with which the piston 25 is connected. Consequently, when the shaft 27 is revolving, the cam device 23, 23a runs idle and no lifting movement of the piston 25, or of the other piston, is effected. Consequently, no lubricant is delivered.

When the cam member 23 is shifted upwardly by correspondingly setting the shaft 20 to the position shown in Fig. 2, the delivery can be set to any value up to the available maximum. Assume that the cam member 23 is lifted off the member 23a the full amount as shown in Fig. 2; then the bracket 24 is also lifted until its lower arm nearly abuts against the lower cam face of member 23a. With the position of shaft revolution shown, the pump is set for maximum delivery, because the pump stroke produced by the cam device is now a maximum so that the chamber 37 reaches maximum volume at the end of the suction stroke.

When the cam member 23 is lifted only part of the available displacement, for instance so that pump supplies one half of the maximum quantity, the bracket 24, when in its uppermost position, is lifted a lesser amount than for the above-mentioned maximum. Consequently, the piston has a shorter stroke length and the delivered quantity is reduced accordingly.

It will be recognized that the above-mentioned regulatable operation is secured only as long as the oil pressure on the inlet side of the pump is below a small limit value. If this value is exceeded, the oil pressure, acting in the above-mentioned chambers 37 and 37', will always lift the piston 25 or 25' as far as the piston will go until the lower arm of its bracket 24 abuts against the lower cam face of cam member 23a. Assume, for instance, that the inlet pressure of the pump is too high; then the pressure beneath the piston will lift it all the way up until the bracket 24 abuts against cam member 23a. Consequently, the pump will then always deliver maximum quantities regardless of the setting of the cam device.

To prevent the temporary and shortlasting passage between inlet duct 1 and oil line 6 from becoming reduced or obstructed at the transitions between the openings 2 and the bore 5, due to any axial displacements of the auxiliary shaft 4 or due to inaccuracies in the manufacture of the radial bores 5, the openings of the radial bores 5 are preferably given an arcuate groove shape elongated in the axial direction of the auxiliary shaft 4. Such groove shaped enlargements are shown at 18 in the modification illustrated in Figs. 3 and 4.

The pressure reducing device may, for instance, also be formed as a slide bearing, consisting of any slide bearing and the pertaining shaft present in the engine as an auxiliary or component part thereof. It is then only necessary to provide the shell or bushing of the slide bearing with bores which are located in a common cross sectional plane and are spaced from each other along the periphery and extend inwardly to the interior diameter of the bushing. The pertaining shaft has radial mating bores located in the same cross sectional plane so that in a given position of the shaft a passageway is temporarily established through the shaft between the two bores of the bearing housing. The bores in the bearing housing are connected with the pressure inlet duct and the oil line 6 respectively as described previously.

The desired pressure reduction is also achieved when the pertaining shaft or auxiliary shaft 4 performs only a partial revolution as is the case, for instance, with the rocker arm shaft of overhead valve engines. This is the case, in the modification shown in Fig. 5 where the rocker arm shaft forms part of the pressure reduction device and has a shaft portion designed in accordance with the auxiliary shaft 4 as shown in Fig. 2, or 3 and 4. The bores in this case are arranged so that the openings in the bearing sleeve or housing separated by the shaft are intermittently and shortlastingly interconnected through the radial bores of the shaft ducts the normal rocking movement of the shaft.

Devices according to the invention as described in the foregoing afford a complete lubrication of the piston-run surfaces in the cylinders with oil from the high-pressure requirements. The expenditure for achieving these results are only slight and in disproportion to the expenditure needed for the attendance to a piston engine supplied with fresh oil, quite aside from the fact that the invention eliminates the danger always involved in fresh-oil systems of having the engine damaged by lack of oil supply due to negligent attendance. Since only a small partial flow of the pressure circulation oil is branched off from the oil filter and passed to the cylinder lubricating pump, another essential advantage is secured by the fact that the filter insert 9 is called upon to filter only the quantity of oil flowing to the pump. Since this quantity is very slight, the oil filter has a long period of useful operation and need be cleaned only after comparatively long periods of engine operation.

During the operation of the engine, the high-presssure of the circulating oil applied to the bearings of the engine machinery, of course, is also effective in the inlet duct 1. However, due to the continual interruption of the oil flow reaching the filter 8 an essential reduction in oil pressure is obtained, the reduced pressure being dependent upon the revolving speed of shaft 4 and the number and dimensions of its radial bores 5. As mentioned, most of the oil supplied to the filter 8 passes through the relief valve 10 back into the oil sump without reaching the inner filter chamber. Due to the action of the valve 10, the pressure of the oil supplied from the inner filter chamber through the line 11 to the common suction portion 12 of the pump 13 is further reduced to the slight pressure required for the satisfactory operation of a fresh-oil pump and has only the small quantity needed for having pump 13 supply the points to be lubricated with cleaned and accurately metered quantities of oil in accordance with the adjustment of the individual pump elements.

The invention is not limited to the particular embodiment specifically illustrated and described. For instance, a device according to the invention may be used with any machines, for instance machine tools, which are equipped with a circulatory high-pressure lubrication system and have additional points to be lubricated with fresh oil.

We claim:

1. With an engine having cylinders with interior slide surfaces, pistons movable on said slide surfaces, and a circulatory lubrication system of relatively high pressure, in combination, a device for lubricating the cylinder slide surfaces comprising a fresh-oil lubricating pump of the metering type having an adjustable delivery within a limited range of input pressure below the pressure in said system, said pump having a pressure side connected with the cylinder slide surfaces to be lubricated, pressure-reduction means having an inlet duct branched off from said system, a filter connected with said pressure reduction means to receive therefrom lubricant of low pressure, said filter having a pressure-relief valve and being connected with said pump to supply to said pump a pre-metered quantity of cleaned lubricant at low pressure.

2. With an engine having a circulatory high-pressure lubrication system and having cylinders forming interior slide surfaces, and pistons movable in said respective cylinders on said slide surfaces, in combination, a device for lubricating the cylinder slide surfaces comprising a fresh-oil lubricating pump of the metering type having an adjustable delivery within a limited range of input pressure below the pressure in said system, said pump having a pressure side connected with the slide surfaces to be lubricated, pressure-reduction means, an oil filter having a pressure relief valve, said means and said filter being series connected with each other to the suction side of said pump and having an inlet duct in communication with said circulation system to supply to said pump a pre-metered quantity of cleaned lubricant at low pressure.

3. With an engine having a circulatory high-pressure lubrication system and having cylinders which form interior slide surfaces, and pistons movable in said respective cylinders on said slide surfaces, in combination, a device for lubricating the cylinder slide surfaces comprising engine-driven pressure-reduction means having an inlet duct branching off from said system and having an outlet duct and having a pressure-relief valve, a lubricant filter connected with said outlet duct, a fresh-oil pump of the metering type having an adjustable delivery within a limited range of input pressure below the pressure in said system, said pump having a suction side connected with said filter and being outputwise connected with the cylinders to be lubricated to deliver thereto pre-metered quantities of cleaned lubricant at low pressure.

4. With an engine having a circulatory high-pressure lubrication system and having cylinders which form interior slide surfaces, and pistons movable in said respective cylinders on said slide surfaces, in combination, a device for lubricating the cylinder slide surfaces comprising springless reduction means having an inlet duct branching off from said system, an oil filter adjoining said reduction means and having a pressure-relief valve, and a lubricating pump of the metering type having an adjustable delivery within a limited range of input pressure below the pressure in said system, said pump having a suction inlet duct connected with said filter and having outlet duct means connected with the cylinders to be lubricated to supply cleaned low-pressure oil thereto.

5. In a piston engine having a circulatory lubrication system and having cylinders which form interior slide surfaces, and pistons movable in said respective cylinders on said slide surfaces, the combination of a pressure-reducing device having an inlet duct branching off from said system and having a sleeve and an engine-driven shaft movable in said sleeve, said sleeve having respective inlet and outlet openings, said shaft having a passage registering with said sleeve openings in a given position of said movable shaft to then temporarily pass a flow of lubricant from said duct through said outlet opening, a lubricant filter connected with said outlet opening and having a pressure-relief valve, and a metering pump having a suction side connected with said filter and having outlet ducts connected with the cylinder to be lubricated.

6. In a piston engine having cylinders and having a circulatory lubrication system and a crankshaft-driven auxiliary shaft, said auxiliary shaft having a stationary bearing sleeve and having a bore located within said sleeve, said sleeve having respective inlet and outlet openings in communication with each other through said bore in a given recurrent position of said shaft, duct means branching off from said system and connected with said inlet opening, a lubricant filter having a filter insert and two chambers separated from each other by said insert, one of said chambers being connected with said outlet opening and having a pressure-relief valve, and a lubricant pump of the metering type having an adjustable delivery within a limited range of input pressure below the pressure in said system, said pump having a suction side connected with said other chamber and having outlet ducts connected with the said cylinders for lubricating said cylinders.

7. With a circulatory high-pressure lubricating system, in combination, a low-pressure lubricating device comprising a fresh-oil lubricating pump of the metering type having an adjustable delivery within a limited range of input pressure below the pressure in said system, said pump having an outlet duct to provide low-pressure lubricant, a driven pressure-reducing metering device having an inlet duct branching off from said high-pressure system, and a lubricant filter connected between said pump and said driven device and having a pressure-relief valve, whereby said pump is supplied with pre-metered amounts of filtered lubricant at a pressure within said range.

References Cited in the file of this patent

FOREIGN PATENTS 597,157     France                Aug. 22, 1925

OTHER REFERENCES

Product Engineering of January, 1949, pages 88 to 90.